United States Patent Office.

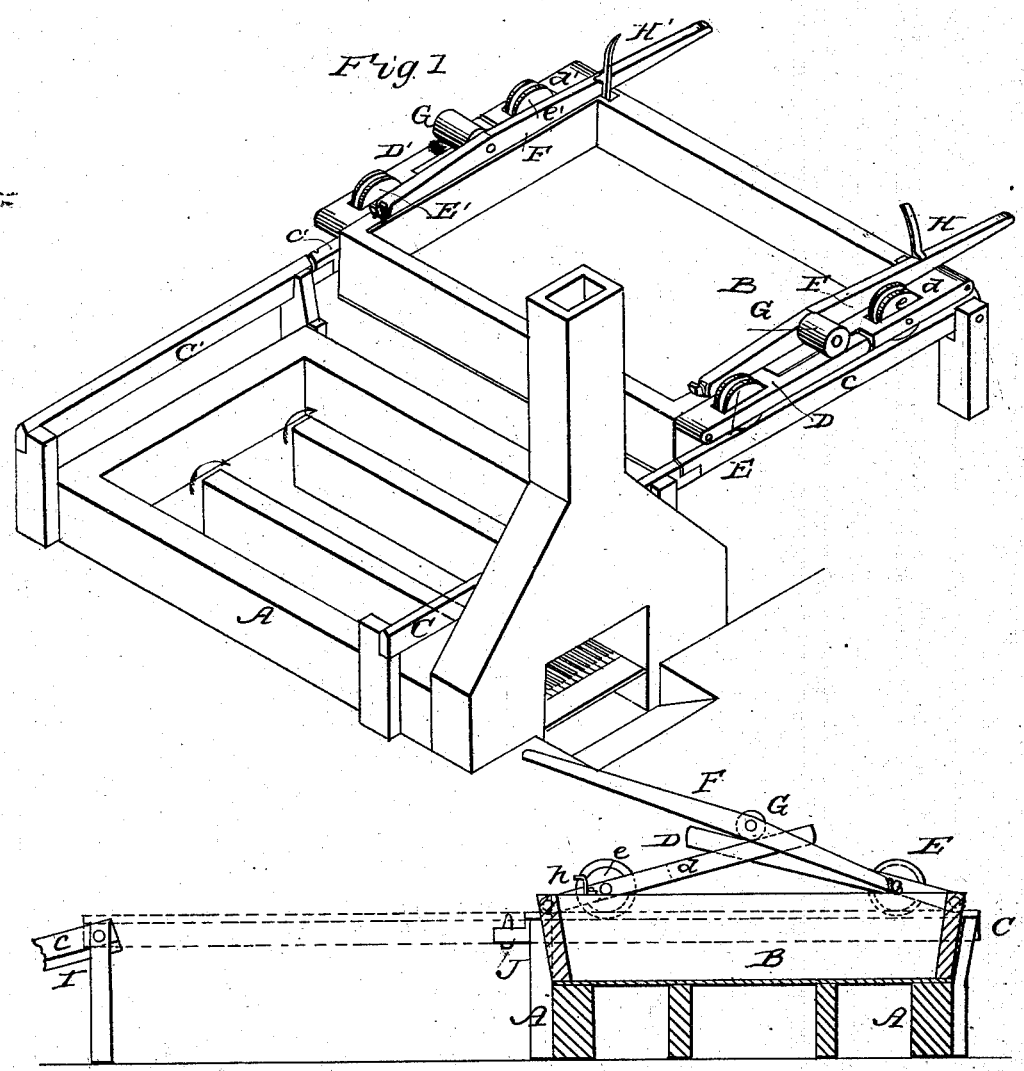

MILBERN TIBBETS, OF LANCASTER, INDIANA.

IMPROVED APPARATUS FOR SHIFTING SUGAR-PANS.

Specification forming part of Letters Patent No. 47,583, dated May 2, 1865.

*To all whom it may concern:*

Be it known that I, MILBERN TIBBETS, of Lancaster, Jefferson county, Indiana, have invented a new and useful device for shifting evaporating-pans on and off of the furnace; and I do hereby declare the following to be a full, clear, and exact description thereof, reference being had to the accompanying drawings, making part of this specification.

My invention relates to a provision for easily and safely removing a sugar-pan or other evaporating-vessel from the furnace.

Figure 1 is a perspective view of a sugar-boiling apparatus embodying my improvement. Fig. 2 is a transverse section of the same.

A represents the external walls of the furnace, on which the pan B rests for boiling.

$C\ c\ C'\ c'$ are two railways, one on each side of the pan.

$D\ d\ D'\ d'$ are arms hinged to the pan-side, as shown, and bearing grooved wheels $E\ e\ E'\ e'$, which rest constantly upon the ways $C\ c$ and $C'\ c'$.

F and F' are two levers, whose studs or rollers G rest, respectively, upon the arms $D\ d$ and $D'\ d'$, so that by depressing the levers, as in Fig. 1, the pan may be lifted bodily from the furnace-walls, so as to rest by its wheels E, $e$, E', and $e'$ upon the ways $C\ c$ and $C'\ c'$. The levers, having been depressed, are held down by any suitable catches, such as shown at H and H' or at $h$.

The portions $c$ and $c'$ of the ways may be so attached to their supports as to be capable of being unshipped when not in use, (see Fig. 2,) so as to permit the operators to approach the pan from any direction. The ways $c$ and $c'$, when thus removable, may be capable of being lifted clear out of their bearings, or the ends most remote from the pan may be hinged to their bearings, as at I, and may in their closed position be additionally held in place by dowels J.

I claim herein as new and of my invention—

1. In the described combination with a furnace and railway, the mode of elevating the evaporating-pan onto the ways by means of the arms $D\ d\ D'\ d'$, wheels $E\ e\ E'\ e'$, levers F G F' G, and catches H H', or devices substantially equivalent.

2. In this connection, the removable sections $c$ and $c'$, arranged and adapted as set forth.

In testimony of which invention I hereunto set my hand.

MILBERN TIBBETS.

Witnesses:
JAMES H. LAYMAN,
GEO. H. KNIGHT.